United States Patent Office 2,928,801
Patented Mar. 15, 1960

2,928,801

POLYETHYLENE COMPOSITION CONTAINING DI-α-CUMYL PEROXIDE, SILICA, AND A STABILIZER, AND PROCESS OF MAKING SAME

Moyer M. Safford, Schenectady, N.Y., and Myron L. Corrin, Tucson, Ariz., assignors to General Electric Company, a corporation of New York No Drawing. Application December 22, 1955
Serial No. 554,627

23 Claims. (Cl. 260—41)

This invention relates to filled polyethylene. More particularly this invention relates to curable compositions comprising (1) polyethylene, (2) silica, (3) a minor amount of a basic material and (4) di-α-cumyl peroxide; and the cured product thereof. The invention also relates to a method of preparing cured silica-filled polyethylene which comprises curing silica-filled polyethylene with di-α-cumyl peroxide in the presence of a basic material.

Among the polymeric materials which have evolved in recent years, polyethylene has proved to be one of the most popular. It has found wide usage as an insulating material, as a container material, as a conduit material, etc. Fabrication, molding, extrusion and calendering of polyethylene are readily accomplished by standard methods, thus facilitating its use for many purposes. Despite all this, however, the applications of polyethylene are greatly limited by its lack of form stability, that is, the ability to retain a particular shape at elevated temperatures, and by its poor high temperature properties, such as poor high temperature tensile strength, tear strength, cut-through strength, etc.

It has been disclosed and claimed in application Serial No. 509,387, Precopio et al., filed May 18, 1955, Patent Number 2,888,424, and assigned to the same assignee as the present application, that di-α-cumyl peroxide-cured polyethylene filled with silica possesses markedly improved properties such as increased tensile strength and percent elongation, particularly at high temperatures.

However, one of the problems sometimes encountered in processing silica-filled polyethylene compositions disclosed in Precopio et al. is that di-α-cumyl peroxide is sensitive to milling at these elevated temperatures at which it is desirable to mill polyethylene into a very homogeneous mixture, thus resulting in the premature decomposition of the peroxide. This is particularly true if the peroxide is added at the beginning, if the milling operation lasts for an extended period of time as is often required for larger batches or if the polyethylene composition is subjected to extreme milling conditions which occurs when the mill rolls are set very close together. Where premature decomposition occurs before a homogeneous mixture is effected, an inferior molded product is subsequently obtained which must be discarded with obvious economic losses.

Although the compositions disclosed and claimed in the above Precopio et al. application have excellent properties if not subjected to these extreme processing conditions, we have now discovered that the effects of long, extreme milling can be corrected or substantially reduced by incorporating a minor amount of a basic material in silica-filled polyethylene. The significance of this discovery is that by routinely incorporating a minor amount of a basic material in silica-filled polyethylene the peroxide contained therein is less sensitive to milling conditions that cause premature decomposition. This result is unexpected since certain peroxides are known to decompose in an explosive manner when contacted with bases.

Although guanidines as a class of basic materials are preferred, other organic bases, basic organic salts and inorganic bases can be employed such as, for example, basic lead carbonate, basic lead silicate, lead oxide, magnesium oxide, zinc oxide, lead maleate, di-basic lead phosphite, lead salt of p-tertiary amyl phenol, dibasic lead phthalate, and the like. Since these basic materials have a stabilizing effect on uncured peroxide-containing filled polyethylene, these compositions may be transported in commerce without deleterious effects.

The most unusual of these basic materials are the guanidines, particularly the aryl substituted guanidines wherein at least one of the amino hydrogens is substituted with at least one aryl group. These compounds incorporated into silica-filled polyethylene not only insure against premature decomposition of the peroxide but also improve the electrical resistivity of the filled compositions. For example, by incorporating diaryl guanidines, e.g. diphenyl guanidine (also called "DPG"), di-tolylguanidine, etc. in silica-filled polyethylene and curing the product, we were able to increase the electrical resistivity over one hundred fold as compared to the corresponding compositions without these guanidines. This is indeed unexpected since other basic materials such as basic lead or magnesium oxides, basic lead carbonates, basic lead silicates, etc. which insured against premature decomposition of the peroxide, failed to improve the electrical properties of the cured silica-filled polyethylene as compared to the corresponding composition containing no basic additive.

The preferred class of basic materials are guanidines, most particularly the guanidines within the scope of the following formula:

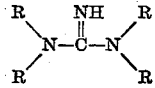

where R's which may or may not be different are selected from the group consisting of hydrogen and a monovalent hydrocarbon radical, for example alkyl, e.g., methyl, ethyl, butyl, isobutyl, octyl, etc. radicals; cyclo-alkyl e.g. cyclohexyl, cycloheptyl, etc. radicals; aryl e.g. phenyl, diphenyl, napthyl, tolyl, xylyl, ethylphenyl, etc. radicals, aralkyl, e.g. benzyl, phenylethyl, etc. radicals. The preferred sub-class includes those compounds wherein at least one of the R groups is an aryl or substituted aryl radical.

The basic material in the polyethylene-silica-peroxide composition can range from .01 to 5% or higher, based on total weight, but preferably from 0.1 to 2%.

The polyethylene referred to herein is a polymeric material formed by the polymerization of ethylene at either low or high pressures. It is described in Patent 2,153,553, Fawcett et al., and in "Modern Plastics Encyclopedia," New York, 1949, pages 268–271. Specific examples of commercially available polyethylene are the polyethylenes sold by E. I. du Pont de Nemours and Co., Inc., Wilmington, Delaware, examples of which are "Alathons 1, 3, 10, 12, 14, etc.," those sold by the Bakelite Company, such as "DE–2400, 3422, DYNH, etc.," and the low pressure Phillips Petroleum Company polymers, such as "Marlex 20, 50, etc." An excellent discussion of low pressure polyethylene within the scope of this invention is found in "Modern Plastics," vol. 33, #1 (September 1955), commencing on page 85.

The filler used in this invention is silica. A description of the various kinds of silica useful in this invention is found in the above Precopio et al. application which is hereby incorporated by reference into the present application. Although the weight percent of filler based on total weight of filler and polyethylene can be varied over wide limits, such as from about 1–75% or higher, the preferable percent of filler is from 20–50%.

The optimum amount of the di-α-cumyl peroxide to be incorporated into the composition depends upon the time and temperature of the heat treatment, and the degree of cure desired in the polymer. Generally, if the peroxide contained composition is cured between 150 to 200° C., from 0.1–20% of the di-α-cumyl peroxide based on weight of the polymer may be used, but preferably 0.5–10%. However, if polyethylene of greatly reduced thermoplasticity is desired, greater amounts of peroxide may be used.

A more complete understanding of this invention may be had by reference to the following illustrative examples which are presented for purposes of illustration and not for purposes of limitation. All parts are by weight.

A series of compositions were prepared by milling various silica-filled polyethylene compositions and curing the resulting product. The elevated temperature, tensile strengths and percent elongations of the cured composition were measured.

EXAMPLE 1

Polyethylene (71 parts), 25 parts of fumed silica having a particle size of 15–20 mμ and 4 parts of di-α-cumyl peroxide were milled for 30 minutes at 130° C. In this example polyethylene, silica and the peroxide were added at the beginning of the milling operation so that all three ingredients were on the mill for 30 minutes. This milled composition after being press-cured at 170° C. for 30 minutes had a tensile strength (135° C.) of 34 p.s.i. and a percent elongation (135° C.) of 200%.

EXAMPLE 2

Polyethylene (70.9 parts), 25 parts of fumed silica (15–20 mμ), 4 parts of di-α-cumyl peroxide, and 0.1 part of diphenylguanidine were milled for 30 minutes at 130° C. In this example all ingredients were added at the beginning of the milling operation so that all four ingredients were on the mill for 30 minutes. This milled composition after being press-cured at 170° C. for 30 minutes had a tensile strength (135° C.) of 810 p.s.i. and a percent elongation (135° C.) of 400%.

EXAMPLE 3

Polyethylene (70 parts) and 30 parts of fumed silica (15–20 mμ) was milled for 13 minutes at 120° C. Thereupon 3 parts of di-α-cumyl peroxide were added and milling continued for an additional 2 minutes. The product, press-cured for 30 minutes at 160–170° C. had a 145° C. tensile strength of 746 p.s.i. and a percent elongation (145° C.) of 350.

EXAMPLE 4

This example was run according to the procedure of Example 3. In this case 70 parts of polyethylene and 30 parts of fumed silica (15–20 mμ) was milled for 13 minutes before adding 4 parts of di-α-cumyl peroxide. Thereupon, milling was continued for an additional 2 minutes. The press-cured product (30 minutes at 160–170° C.) had a tensile strength (145° C.) of 492 and a percent elongation (145° C.) of 250.

By using the above procedure described in Examples 3 and 4 where the peroxide was added at the end of the milling operation, the high tensile strengths of silica-filled polyethylene disclosed in Table II of the above mentioned Precopio et al. application were obtained.

From these examples it is apparent that the manner in which di-α-cumyl peroxide is milled into silica-filled polyethylene determines the properties of the cured product. Furthermore, it is evident that basic materials such as diphenyl guanidine eliminate or reduce the effect of long, faulty or excessive milling.

In order to find out if other basic materials produce the same effect, several other basic materials were used in silica-filled polyethylene compositions.

A series of compositions comprising 68 parts of polyethylene, 2 parts of various bases, 25 parts of fumed silica (15–20 mμ), and 5 parts of di-α-cumyl peroxide was milled at 120° C. for an extended period of time and then cured for 30 minutes at 170° C. All ingredients were added at the beginning of the milling operation.

As a control, a composition comprising 70 parts of polyethylene, 5 parts of di-α-cumyl peroxide and 25 parts of the corresponding silica were similarly treated.

In contrast to the low tensile strengths (135° C.) obtained with the control (no basic material) the base containing composition had the tensile strengths stated in Table I.

*Table I*

| Example | Base Used | Tensile Strength, p.s.i., 135° C. |
|---|---|---|
| 5 | No base used | 34 |
| 6 | Basic Lead Carbonate | 515 |
| 7 | Dibasic Lead Phosphate | 525 |
| 8 | Basic Lead Salt of p-tertiary amyl phenol | 575 |
| 9 | Dibasic Lead Phthalate | 600 |
| 10 | Basic Lead Silicate-Sulfate Compound ("Tribase E") | 610 |

From this table it is evident that a wide variety of basic materials enhance the physical properties of filled-cured polyethylene.

Another series of compositions were prepared containing 100 parts of polyethylene, 18 parts of a precipitated silica having a particle size of about 25 mμ, and 2.85 parts of di-α-cumyl peroxide. Example 11 (the control) had no basic material, Example 12 had 0.71 part of diphenyl guanidine, Example 13, 0.71 part of basic lead carbonate, Example 14, 0.71 part of basic lead silicate, and Example 15, 0.71 part of di-orthotolyl-guanidine. These compositions were milled at 95–100° C. for about 20 minutes and cured at 150–155° C. for 30 minutes. The results are presented in Table II.

*Table II*

| Ex. | Base | Direct Current Resistivity, ASTM D-257-46 | | Power Factor, ASTM D-150-47T | | Dielectric Constant, ASTM D-150-47T | |
|---|---|---|---|---|---|---|---|
| | | Room Temp. | 70° C. | Rm. Temp. | 70° C. | Rm. Temp. | 70° C. |
| 11 | None | .28 | 0.238 | 0.095 | 0.259 | 2.73 | 3.96 |
| 12 | Diphenyl guanidine | 7,030 | 217 | 0.0739 | 0.1661 | 2.73 | 3.64 |
| 13 | Basic Lead Carbonate | 25.1 | 0.314 | 0.1115 | 0.264 | 2.80 | 4.08 |
| 14 | Basic Lead Silicate | 23.2 | 0.355 | 0.096 | 0.233 | 2.82 | 3.77 |
| 15 | Di-ortho tolyl guanidine | 7,442 | 202 | 0.061 | 0.152 | 2.63 | 3.34 |

Although no appreciable improvement was noted in power factor or dielectric constant when either organic or inorganic bases were incorporated in filled polyethylene, marked improvement was observed when organic bases such as aryl guanidines were incorporated into filled polyethylene. No similar improvement was noted with inorganic bases.

The products of this invention are adaptable for hot strength films, for tapes, for industrial laminates, for conduits or containers for hot liquids, etc. They can be used in electrical applications such as for electrical insulation, for electrical parts, e.g. spark plug caps, etc. Modifying agents, such as dyes, pigments, stabilizers, etc. may be added to these compositions without departing from the scope of the invention.

What we claim as new and desire to secure by Letters Patent of the United States is:

1. A curable composition stable during milling comprising (1) polyethylene, (2) di-α-cumyl peroxide, (3) 1–75% by weight silica, and (4) about 0.01–5% by weight of a basic material selected from the group consisting of basic lead salts, lead oxide, magnesium oxide, zinc oxide and guanidines having the formula

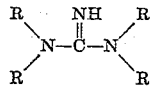

where R is a member selected from the group consisting of hydrogen and monovalent hydrocarbon radicals.

2. The cured composition of claim 1.
3. The composition of claim 1 wherein the basic material is a basic lead salt.
4. The cured composition of claim 3.
5. The composition of claim 1 wherein the basic material is a basic lead silicate.
6. The cured composition of claim 5.
7. A curable composition stable during milling comprising (1) polyethylene, (2) di-α-cumyl peroxide, (3) 1–75% by weight silica, and (4) about 0.01–5% by weight of a guanidine of the formula

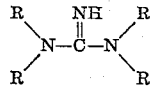

where R is selected from the group consisting of hydrogen and monovalent hydrocarbon radicals.

8. The cured product of claim 7.
9. The composition of claim 7 in which the guanidine is diphenyl guanidine.
10. The cured composition of claim 9.
11. The composition of claim 7 in which the guanidine is di-tolyl guanidine.
12. The cured composition of claim 11.
13. A process which comprises curing a polyethylene composition containing from 1–75% by weight silica with di-α-cumyl peroxide in the presence of about 0.01–5% by weight of a basic material selected from the group consisting of basic lead salts, lead oxide, magnesium oxide, zinc oxide, and guanidines having the formula

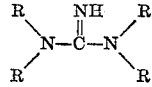

where R is selected from the group consisting of hydrogen and monovalent hydrocarbon radicals.

14. The process of claim 13 wherein the basic material is a guanidine having the formula

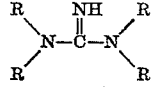

where R is selected from the group consisting of hydrogen and monovalent hydrocarbon radicals.

15. The process of claim 14 wherein the guanidine is diphenyl guanidine.

16. The process of claim 14 wherein the guanidine is di-tolyl guanidine.

17. A process of stabilizing a polyethylene composition containing 1 to 75% silica and 0.1 to 20% di-α-cumyl peroxide against premature loss of peroxide prior to curing which comprises processing the composition in the presence of about 0.01 to 5% of a basic material selected from the group consisting of basic lead salts, lead oxide, magnesium oxide, zinc oxide, and guanidines having the formula

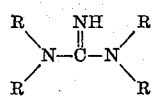

where R is selected from the group consisting of hydrogen and monovalent hydrocarbon radicals.

18. The process as in claim 17 wherein the basic material is a guanidine having the formula

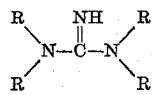

where R is selected from the group consisting of hydrogen and monovalent hydrocarbon radicals.

19. The process as in claim 18 wherein the guanidine is diphenyl guanidine.
20. The process as in claim 18 wherein the guanidine is ditolyl guanidine.
21. The process of improving the power factor of a polyethylene composition containing 1 to 75% silica and 0.1 to 20% di-α-cumyl peroxide which comprises incorporating about 0.01 to 5% of a guanidine having the formula

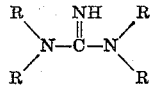

where R is selected from the group consisting of hydrogen and monovalent hydrocarbon radicals, into the polyethylene prior to the final shaping wherein the di-α-cumyl peroxide is decomposed to cause curing of the polyethylene composition.

22. The process as in claim 21 wherein the guanidine is diphenyl guanidine.
23. The process as in claim 21 wherein the guanidine is ditolyl guanidine.

References Cited in the file of this patent

UNITED STATES PATENTS

| | | |
|---|---|---|
| 2,527,640 | Lorand | Oct. 31, 1950 |
| 2,628,214 | Pinkney et al. | Feb. 10, 1953 |
| 2,826,570 | Ivett | Mar. 11, 1958 |

FOREIGN PATENTS

| | | |
|---|---|---|
| 149,565 | Australia | June 2, 1949 |

OTHER REFERENCES

Ind. and Eng. Chem., Filled Polyethylene Compounds, by R. Bostwick et al., pages 848 and 849, May 1950.